US012659643B2

(12) United States Patent
Xiong et al.

(10) Patent No.: US 12,659,643 B2
(45) Date of Patent: Jun. 16, 2026

(54) COMPOSITE EARPHONE FILM AND RELATED APPLICATOR

(71) Applicant: Shenzhen Abee Technology Co., Ltd, Shenzhen City (CN)

(72) Inventors: Qiang Xiong, Shenzhen City (CN); Gang Zeng, Shenzhen City (CN)

(73) Assignee: SHENZHEN ABEE TECHNOLOGY CO., LTD., Shenzhen City (CN)

( * ) Notice: Subject to any disclaimer, the term of this patent is extended or adjusted under 35 U.S.C. 154(b) by 268 days.

(21) Appl. No.: 17/771,621

(22) PCT Filed: Dec. 3, 2021

(86) PCT No.: PCT/CN2021/135233
§ 371 (c)(1),
(2) Date: Oct. 6, 2023

(87) PCT Pub. No.: WO2022/233130
PCT Pub. Date: Nov. 10, 2022

(65) Prior Publication Data
US 2024/0121544 A1 Apr. 11, 2024

(30) Foreign Application Priority Data
May 6, 2021 (CN) ........................ 202120936192.2

(51) Int. Cl.
*H04R 1/10* (2026.01)

(52) U.S. Cl.
CPC .................................. *H04R 1/1016* (2013.01)

(58) Field of Classification Search
CPC .......... H04R 1/10; H04R 1/1016; H04R 1/12; H04R 2201/10; H04R 25/652;
(Continued)

(56) References Cited

U.S. PATENT DOCUMENTS 10,550,298 B2 * 2/2020 Jozuka .................. C09J 133/06
2004/0071918 A1 * 4/2004 Cohen ...................... C09J 7/403
428/40.1
2023/0144464 A1 * 5/2023 Shimizu ................ C08F 226/10
428/355 AC

FOREIGN PATENT DOCUMENTS

CN 204750661 6/2015
CN 105829473 A * 8/2016 ......... C08G 18/4018
(Continued)

OTHER PUBLICATIONS

International Search Report for International Application No. PCTCN2021135233 dated Mar. 2, 2022.

*Primary Examiner* — Ryan Robinson
(74) *Attorney, Agent, or Firm* — United IP Counselors, LLC

(57) ABSTRACT

This utility model provides a composite film, which comprises a main film, one side surface of the main film is provided with a release film, another side surface of the main film is provided with a base film, the base film is used for pasting in the applicator, the end of the release film is provided with a pulling part, and the pulling part is used to facilitate the separation of the release film. This utility model further provides an earphone applicator matched with the composite film. This utility model realizes the aligning of the composite film and the applicator through a fixing jig, and further achieves the goal of aligning the main film, so as to solve the deviation problem existing in the earphone film application, increase the efficiency of film application, and avoid the waste of the films.

9 Claims, 3 Drawing Sheets

(58) Field of Classification Search
CPC .. H04R 25/656; H04R 25/658; H04R 25/659; H04R 2201/105; H04R 2225/025; H04R 2225/77; H04R 2460/17; Y10T 428/1476
See application file for complete search history.

(56) References Cited

FOREIGN PATENT DOCUMENTS

| | | | | | |
|---|---|---|---|---|---|
| CN | 206141198 | U | * | 5/2017 | |
| CN | 107001870 | A | * | 8/2017 | ............. B32B 25/06 |
| CN | 208147693 | U | * | 11/2018 | |
| CN | 110611855 | A | * | 12/2019 | ........... H04R 1/1083 |
| CN | 111031430 | A | * | 4/2020 | ........... H04R 1/1083 |
| CN | 210899548 | U | * | 6/2020 | |
| CN | 211019173 | U | * | 7/2020 | |
| CN | 212952009 | | | 7/2020 | |
| CN | 214708024 | | | 5/2021 | |
| CN | 113614194 | A | * | 11/2021 | .............. C09J 7/383 |
| CN | 214818216 | U | * | 11/2021 | |
| CN | 214851325 | U | * | 11/2021 | |
| CN | 215420665 | U | * | 1/2022 | |
| CN | 215818551 | U | * | 2/2022 | |
| CN | 216357226 | U | * | 4/2022 | |
| CN | 218550125 | U | * | 2/2023 | |
| CN | 220629526 | U | * | 3/2024 | |
| JP | 2007116577 | A | * | 5/2007 | |
| JP | 3179230 | U | * | 10/2012 | |
| JP | 3181833 | U | * | 2/2013 | |
| JP | 2017115107 | A | * | 6/2017 | |
| JP | 3242018 | U | * | 5/2023 | |
| TW | M317726 | U | * | 8/2007 | |
| WO | WO-2017065124 | A1 | * | 4/2017 | ............ C09J 201/00 |
| WO | WO-2022137924 | A1 | * | 6/2022 | ............. B32B 27/00 |

* cited by examiner

COMPOSITE EARPHONE FILM AND RELATED APPLICATOR

FIELD OF THE INVENTION

This utility model involves the technical field of protective film. More specifically, it involves a composite earphone film and related matching applicator.

BACKGROUND INFORMATION

With the development of science and technology, more and more types of earphones are appeared on the market, especially portable Bluetooth earphones. The frequency of using earphones to listen to music and make calls is higher now, but the situation of scratches or wear and tear can be found on the main body section of the earphone after a period of frequent use, so that consumers begin to pay attention to the protection of the main body sections of the earphones.

Currently, there is no earphone film equipment for sale on the market, only some merchants sell earphone film. However, during the earphone film application (in the process of filming the earphones), it is found that due to the small size of the earphones, the manual filming will make the hand contact with part of the film, which will stain the earphone films; or, there is a deviation problem during the filming process, and the protective film needs to be re-applied or replaced at this time. In these cases, both time and protective film are wasted, the efficiency is low, and the effect of the film is difficult to guarantee.

SUMMARY

With respect to the aforesaid disadvantages in the prior art, the present utility model aims to provide a composite film;

The present utility model further provides an earphone applicator to be matching used with the composite film.

The present utility model provides a composite film, which comprises a main film, one side surface of the main film is provided with a release film, another side surface of the main film is provided with a base film, the base film is used for pasting in the applicator, the end of the release film is provided with a pulling part, and the pulling part is used to facilitate the separation of the release film.

Preferably, a pattern layer is provided on the main film.

This utility model provides an earphone applicator to be matching used with the composite film, the earphone applicator comprises a aligning main body and a restricting (limiting)part, the aligning main body is arranged in a spoon shaped contour, the contour of the aligning main body matched the contour of the earphone, and the restricting part is arranged on the aligning main body to accommodate one end of the earphone body.

A horizontal part is arranged at the part of aligning main body corresponding to the earphone body, and the horizontal part is used for fixing the composite films.

Preferably, the aligning main body comprises an aligning groove one and an aligning groove two, the aligning groove one and the aligning groove two are formed integrally, the aligning groove one and the aligning groove two are formed in a spoon shaped structure, the aligning groove one is used for fixing the in-ear part of the earphone, the aligning groove two is used for fixing the earphone body, and the restricting part is arranged on one end of the aligning groove two away from the aligning groove one.

The horizontal part is arranged on the two sides of the aligning groove two, the width of the horizontal part is less than the width of the composite film, the pulling part is floating arranged on the outer side of the horizontal part after composite film is fixed.

Preferably, a groove is provided in the middle of the restricting part, and the groove is used for an earphone cord (wire) to go through, so as to meet the requirements when using a wired earphone.

Preferably, an abutment part is provided on top center of the front side of the aligning groove one.

Preferably, the aligning groove one matches with the in-ear part of the earphone, the joint part of the aligning groove one and the aligning groove two is arranged as a curved surface.

Preferably, a protrusion part is provided at the bottom of the back side of the aligning groove two, and the protrusion part is used to facilitate holding the applicator by hand during the film sticking for the earphone.

Preferably, it further comprises a fixing jig, and the fixing jig is used for fixing the composite film in the aligning groove two.

Preferably, the fixing jig comprises an aligning groove three and an aligning groove four, The aligning groove three matches the contour of the aligning main body, the aligning groove three accommodates the aligning main body;

The aligning groove four matches the contour of the composite film, which is used for fixing the composite film on the horizontal part.

Compared with the prior art, the composite film and the matching earphone applicator that provided by the present utility model have the following beneficial effects:

1. the composite film of the present utility model is matched with the earphone applicator, which can achieve high-efficiency film application, so as to greatly save the cost and to save time and effort;
2. The applicator of the present utility model fixes the earphone through multiple aligning grooves firstly, and then make the main film and the earphone body closely fit by pressing the earphone body, and then finish the final film by removing the earphone with manual assistance. The whole process of film application saves time and effort, and is high accurate;
3. The composite film and the applicator of the present utility model realizes the process of fixing and filming the earphone through multiple aligning grooves and the restricting part. It's simple in structure, convenient and practical, not only suitable for wireless Bluetooth earphones, but also suitable for ordinary wired earphones.

BRIEF DESCRIPTION OF THE DRAWINGS

In order to illustrate the embodiments of this utility model or the technical solutions in the prior art more clearly, the following will further described this utility model combined with the drawing and the embodiments. The drawings in the following description are merely part of the embodiments of this utility model. For those ordinary skilled in the art, other drawings can be further obtained from these drawings without any creative effort.

The reference marks in the drawings.

| | | |
|---|---|---|
| 1. aligning main body | 11. aligning groove one | 12. aligning groove two |
| 2. restricting part | 21. groove | 3. composite film |
| 31. main film | 32. release film | 321. pulling part |
| 32. base film | 4. horizontal part | 5. abutment part |
| 6. protrusion part | 7. fixing jig | 71. aligning groove three |
| 72. aligning groove four | | |

DETAILED DESCRIPTION

Hereinafter, the embodiments of the composite film and the matching earphone applicator in the utility model will be described with reference to the drawings.

The embodiments provided here are the particular implementations of this utility model, and are used to illustrate the concept of this utility model. They are all illustrative and exemplary, and should not be construed as limiting the implementations and scope of this utility model. Besides of the embodiments provided here, those skilled in the art can further apply other apparent technical solutions based on the contents disclosed by the claims and specification of this utility model, and these technical solutions comprise the technical solutions with any apparent replacements and amendments to the embodiment provided herein.

The drawings of this specification are schematic diagrams for assistance in explaining the conception of this utility model and showing the mutual relationship of each part schematically. Please note that, in order to clearly explain the relationship of each part in this utility model, same or similar reference marks are used to show the same or similar parts.

Figure 1:
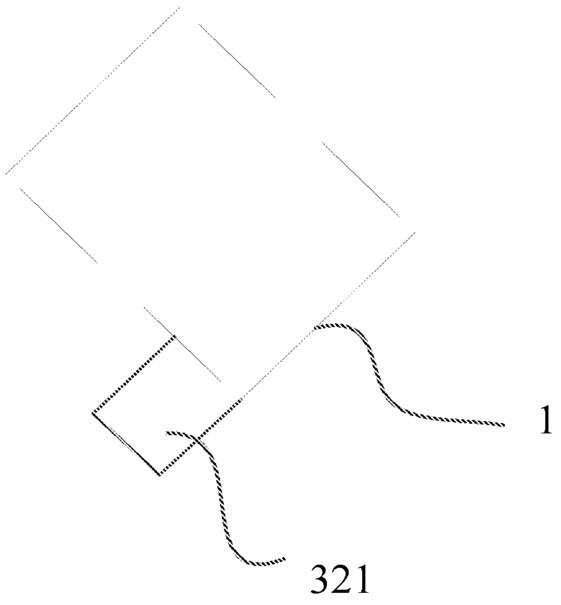
FIG. 1 is a structure diagram of the composite film of this utility model.
Figure 2:
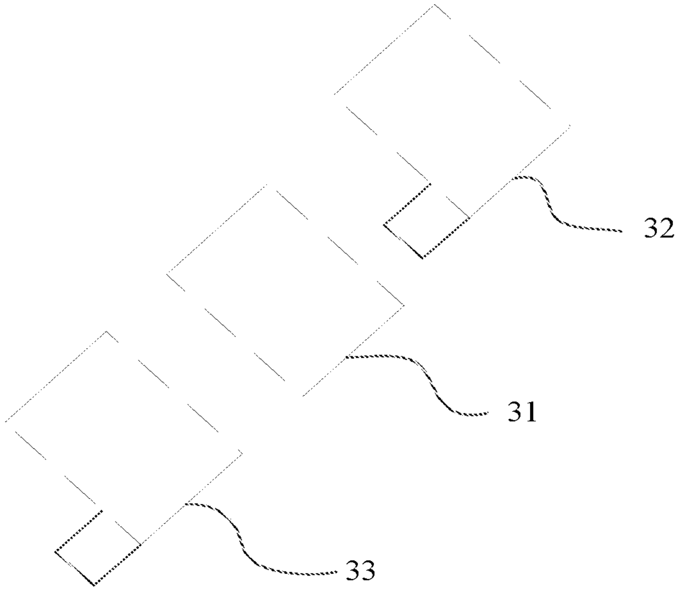
FIG. 2 is an exploded schematic diagram of the composite film of this utility model.
Figure 3:
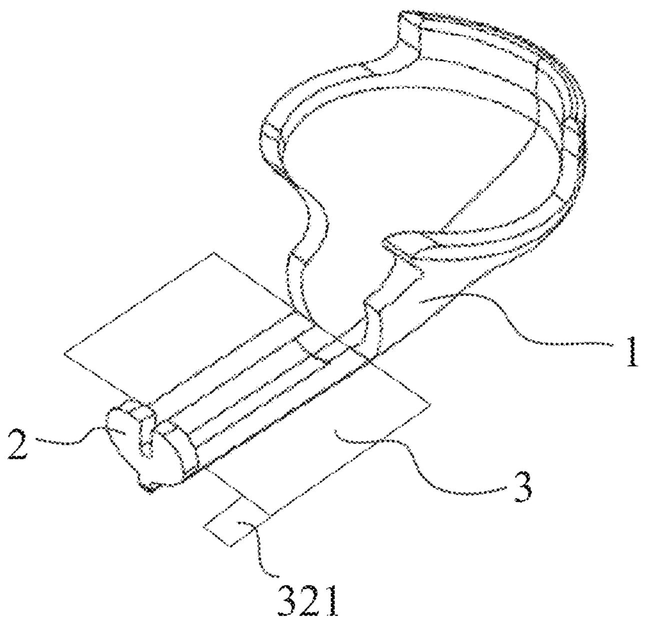
FIG. 3 is a structure schematic diagram of the composite film and the matching earphone applicator of this utility model.
Figure 4:
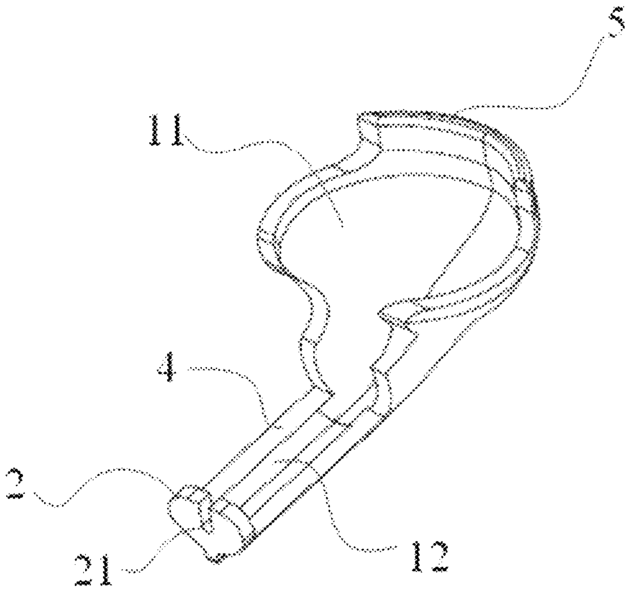
FIG. 4 is a structure schematic diagram of the applicator of this utility model.
Figure 5:
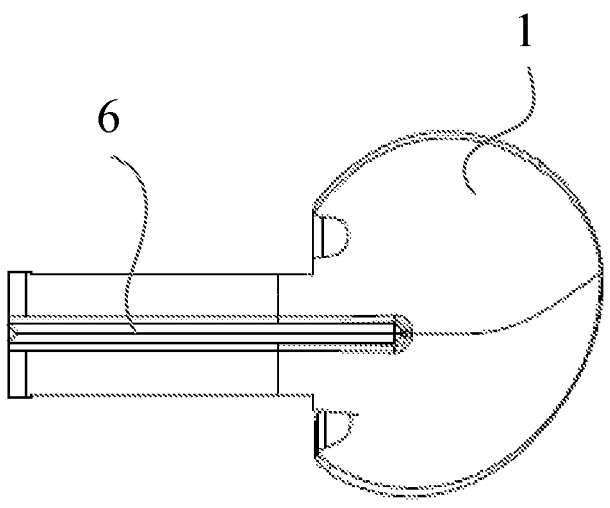
FIG. 5 is a back view structure diagram of the applicator of this utility model.
Figure 6:
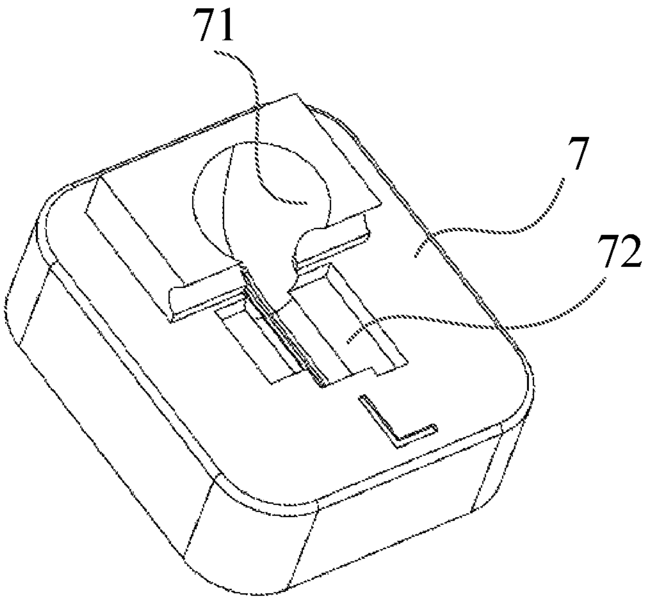
FIG. 6 is a schematic structure diagram of the fixing jig of this utility model.

According to a preferable embodiment of this utility model, a composite film 3 as illustrated in FIGS. 1-2 comprises a main film 31, one side surface of the main film 31 is provided with a release film 32, another side surface of the main film 31 is provided with a base film 33, the base film 33 is used for pasting in the applicator, the end of the release film 32 is provided with a pulling part 321, the pulling part 321 is used to facilitate the separation of the release film 32. Wherein, the pulling part 321 may be provided only on the end of the release film 32, may also be provided on the pulling part 321 and the base film 33, respectively. The main film 31, the release film 32 and the base film 33 are provided in the same contour. The main film 31, the release film 32 and the base film 33 are sequentially provided from top to bottom, and the three layers of the film are attached together before use.

The main film 31 of this utility model is provided with a pattern layer, and the pattern layer is printed with different patterns. The users can choose the films with different patterns according to their own requirements. In the utility model, the films printed with different patterns is applied (pasted) on the earphone bodies, so as to not only meet the requirement of the aesthetical appearance of the earphone, but also meets the requirement of the modern young people's pursuit of fashion and personalized design, and further prevents the earphone bodies from being scratched.

The size of the film matches the earphone body, or is slightly smaller than the length of the earphone body.

The base film 33 of the present invention is attached to the main film 31, and can be directly torn off after the film is attached, which is very convenient and quick. The base film 33 of this utility model is attached on the main film 31, and can be torn off after the film is applied, which is very convenient and fast.

This utility model further provides an earphone applicator matched with the composite film 3, the applicator comprises an aligning main body 1 and a restricting part 2, the aligning main body 1 is arranged in a spoon shaped contour, the contour of the aligning main body 1 matches the contour of the earphone, the restricting part 2 is arranged on the aligning main body 1 to accommodate one end of the earphone body; the part of aligning main body 1 corresponding to the earphone body is provided with a horizontal part 4, and the horizontal part 4 is used for fixing the composite films 3. Specifically, the composite film 3 can be fixed on the horizontal part 4 by double-sided tape, or can also be fixed by other methods, not limited as the fixing and connection method through double-sided tape.

Wherein, the depth of the aligning main body 1 is less than or near the height of the corresponding part of the earphone, so as to facilitate the removal of the earphone.

Preferably, the aligning main body 1 comprises an aligning groove one 11 and an aligning groove two 12, the aligning groove one 11 and the aligning groove two 12 are formed integrally, and the aligning groove one 11 and the aligning groove two 12 are formed in a spoon shaped structure, the aligning groove one 11 is used for fixing the in-ear part of the earphone, the aligning groove two 12 is used for fixing the earphone body, the restricting part 2 is arranged on one end of the aligning groove two 12 away from the aligning groove one 11; the horizontal part 4 is arranged on the two sides of the aligning groove two 12, the width of the horizontal part 4 is less than the width of the composite film 3, the pulling part 321 is floating arranged on the outer side of the horizontal part 4 after composite film 3 is fixed. Wherein, the horizontal part 4 is arranged at the edge of the two sides of the aligning groove two 12, so as to make the horizontal part 4 and the aligning groove two 12 as a letter U shaped structure, and the composite film 3 is attached on the horizontal part 4 before use.

During the film application (the process of filming), first tear off the release film 32 through the pulling part 321, then put the earphone body and the in-ear part of the earphone into the aligning groove two 12 and the aligning groove one 11 correspondingly so as to restrict the earphone in the aligning main body 1 through the cooperation (joint action) of the aligning groove one 11, the aligning groove two 12 and the restricting part 2, and press the earphone body simultaneously so as to make the main film 31 tightly contact and attach on the earphone body, then take the earphone out, and finish the film application on other parts of the earphone body with manual assistance.

In a further embodiment of this utility model, a groove 21 is provided in the middle of the restricting part 2, and the groove 21 is used to pass through the earphone cord, so as to meet the requirements when using a wired earphone, wherein the width of the groove 21 is smaller than the width of the aligning groove two 12, as long as itis sufficient to accommodate the earphone cord, and the shape is preferably a circular arc design, which is not only beautiful in appearance, but also more in line with the contour design of the earphone cord.

In a further embodiment of this utility model, an abutment part 5 is provided in the middle of the front side top of the aligning groove one 11. This design is to make the in-ear part of the earphone away from the earphone body and can abut on the abutment part 5 after the earphone is placed in the aligning groove one 11, preventing the earphone from slipping out of the aligning groove one 11 due to uneven force, and only providing the earphone in the middle of the front side top of the aligning groove one 11 is to facilitate the easy removal after the earphone is fixed.

Preferably, the aligning groove one 11 is matched with the in-ear part of the earphone, the connection between the aligning groove one 11 and the aligning groove two 12 is set as a curved surface. Due to the in-ear part of the earphone is designed combining the artificial curve of human ear, in order to make the aligning groove one 11 more fit the in-ear part of the earphone. The in-ear part of the earphone is correspondingly designed as a curved surface, and the specific curved surfaces can be specifically designed according to different types of earphones.

Due to the earphone needs to be fixed into the aligning main body 1 first during the film application, for the stability during the fixing process of the earphone, a protrusion part 6 can be provided at the bottom of the back side of the aligning groove two 12, the protrusion part 6 facilitates holding the applicator by hand during the film application. Due to the small size of the earphone, the aligning main body 1 is small in size correspondingly, so that in the process of fixing the earphone inside the aligning main body 1, the back of the applicator can be held by hands, and the balance and stability is maintained under the auxiliary action of the protrusion part 6 in the meantime, so that the earphone is fixed rapidly in the aligning main body 1, that is the earphone is aligned or accommodated in the aligning groove one 11 and the aligning groove two 12.

In a further embodiment of this utility model, the earphone applicator further comprises a fixing jig 7 which is used for fixing the composite film 3 on the horizontal part 4 on the two sides of the aligning groove two 12. Due to the small size of the earphone, there will be misalignment through manual filming, thus wasting the film. Thus, the composite film 3 can be fixed on the horizontal part 4 in advance through the fixing jig 7, so as to make sure that the composite film 3 is fixed on the horizontal part 4 and can be accurately aligned on the horizontal part 4.

Specifically, the fixing jig 7 comprises a aligning groove three 71 and a aligning groove four 72, the aligning groove three 71 matches the contour of the aligning main body 1, the aligning groove three 71 accommodates the aligning main body 1; the aligning groove four 72 matches the outline of the composite film 3, which is used for fixing the composite film 3 on the horizontal part 4. This is designed so that the applicator can be placed into the aligning groove three 71, and then the composite film 3 with double-sided tape on the back is put into the aligning groove four 72 and pressed, so that the composite film 3 is fixed on the horizontal part 4 on the two sides of the aligning groove 72. Then the applicator is taken out to start the film application (the filming process).

Wherein, a aligning groove corresponding to the pulling part 321 of the composite film 3 is provided in the aligning groove four 72 of the fixing jig 7, the composite film 3 can be aligned accurately through the aligning groove.

During the application, first tear off the release film 32 through the pulling part 321, then align the earphone body in the aligning groove one 11 and the aligning groove two 12, then press the earphone body to make the earphone body tightly attached with the main film 31, then take the earphone out and finish the film application on other parts of the earphone body section with manual assistance, and finally tear off the base film to finish the film application.

The implementations of the composite film and the matching earphone applicator of this utility model have been described above. The specific features of the composite film and the matching earphone applicator of this utility model can be designed specifically according to the functions of the features disclosed above, and these designs can be achieved by those skilled in the art. Besides, the technical features disclosed above are not limited to the disclosed combinations with other features, and those skilled in the art can also perform other combinations between the technical features according to the purpose of this utility model, as long as to achieve the purpose of this utility model.

What is claimed is:

1. An earphone applicator to be used with a composite film, the composite film comprising a main film, one side surface of the main film is provided with a release film, another side surface of the main film is provided with a base film, the base film is used for pasting in the earphone applicator, an end of the release film is provided with a pulling part, and the pulling part is used to facilitate the separation of the release film;

the earphone applicator comprising:

a locating main body and a restricting part, the locating main body being arranged in a spoon shaped contour, the contour of the locating main body matching the contour of an earphone, and the restricting part being arranged on the locating main body to accommodate one end of the earphone body; and a horizontal part being arranged at the part of locating main body corresponding to the earphone body, and the horizontal part being used for fixing the composite film.

2. The earphone applicator according to claim 1, wherein the locating main body comprises a locating groove one and a locating groove two, the locating groove one and the locating groove two are formed integrally, the locating groove one and the locating groove two are formed in a spoon shaped structure, the locating groove one is used for fixing in-ear part of the earphone, the locating groove two is used for fixing the earphone body, the restricting part is arranged on one end of the locating groove two away from the locating groove one;

the horizontal part is arranged on two sides of the locating groove two, the width of the horizontal part is less than the width of the composite film, and the pulling part is floating arranged on the outer side of the horizontal part after composite film is fixed.

3. The earphone applicator according to claim 2, wherein a groove is provided in the middle of the restricting part, and the groove is used for an earphone cord to go through.

4. The earphone applicator according to claim 1, wherein an abutment part is provided on top center of front side of the locating groove one.

5. The earphone applicator according to claim 1, wherein the locating groove one matches with the in-ear part of the earphone, and the joint part of the locating groove one and the locating groove two is arranged as a curved surface.

6. The earphone applicator according to claim 1, wherein a protrusion part is provided at the bottom of the back side of the locating groove two, and the protrusion part is used to facilitate holding the applicator by hand during the earphone film application.

7. The earphone applicator according to claim 2, further comprising a fixing jig, and the fixing jig is used for fixing the composite film in the locating groove two.

8. The earphone applicator according to claim 7, wherein the fixing jig comprises a locating groove three and a locating groove four, the locating groove three matches the contour of the locating main body, and the locating groove three accommodates the locating main body;

the locating groove four matches the contour of the composite film, which is used for fixing the composite film on the horizontal part.

9. The earphone applicator according to claim 1, wherein the main film is provided with a pattern layer.

* * * * *